Figure 1:
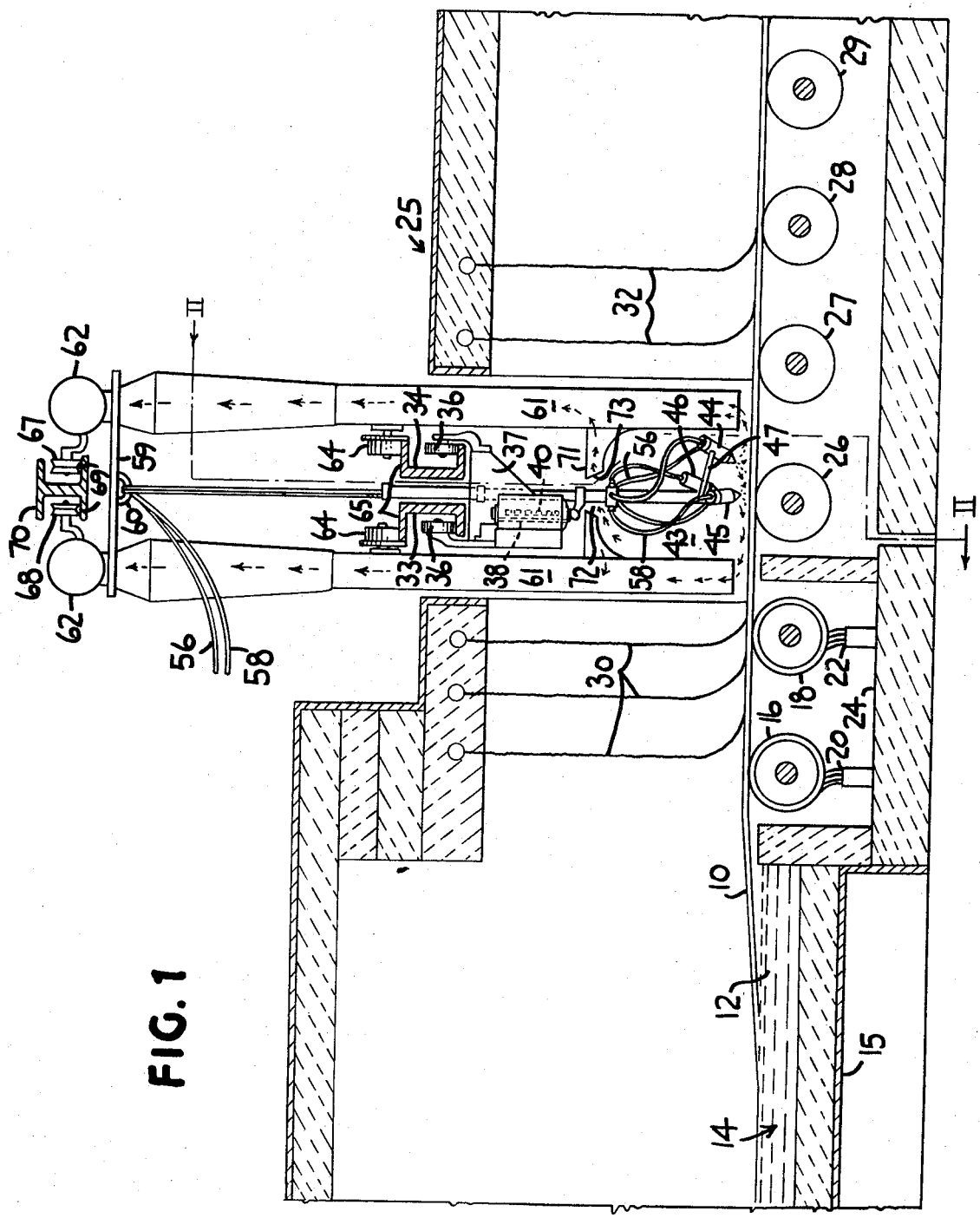

United States Patent
Donley et al.

[15] 3,660,061
[45] May 2, 1972

[54] COATED GLASS SHEET AND METHOD FOR MAKING THE SAME

[72] Inventors: Harold E. Donley, Monroeville; Raymond G. Rieser, New Kensington; William E. Wagner, Verona, all of Pa.

[73] Assignee: PPG Industries, Inc., Pittsburgh, Pa.

[22] Filed: Mar. 5, 1970

[21] Appl. No.: 16,670

Related U.S. Application Data

[63] Continuation-in-part of Ser. No. 684,131, Nov. 20, 1967, abandoned.

[52] U.S. Cl.................................65/32, 65/30, 65/60, 65/99, 65/182, 117/124, 65/114, 161/1
[51] Int. Cl. ........................C03c 15/00, C03b 18/00
[58] Field of Search...........65/30, 32, 60, 99, 114, 182; 117/124; 161/1

[56] References Cited

UNITED STATES PATENTS

| | | | |
|---|---|---|---|
| 3,438,760 | 4/1969 | Loukes et al. | 65/30 |
| 2,671,033 | 3/1954 | Waggoner | 65/60 X |
| 3,473,908 | 10/1969 | Snow | 65/99 |

Primary Examiner—Frank W. Miga
Attorney—Chisholm and Spencer

[57] ABSTRACT

Applying a solution of a metal oxide film forming composition in an oxidizing atmosphere to a surface of a newly formed glass sheet to which oxidizing atmosphere and sheet has been exposed for at least approximately 3 seconds after removing the sheet from a reducing atmosphere containing molten tin and its vapor while the glass surface is at a temperature sufficiently high to pyrolize said composition to form a metal oxide coating thereon of sufficient thickness to provide the coated glass with desired properties, such as reducing the transmission of certain wave lengths of light in one or more desired wavelength bands through the coated sheet or making the coated sheet electroconductive. Care is taken to insure that the carrier for said composition does not evaporate completely en route to the glass surface to avoid a mottled appearance. A particularly desirable operation is to produce a continuous ribbon of a substantially homogeneous float glass composition and periodically apply a metal oxide film forming composition to provide the glass with an appearance and color similar to those of glass compositions containing coloring ingredients homogenously dispersed throughout the glass.

9 Claims, 2 Drawing Figures

INVENTORS
HAROLD E. DONLEY
RAYMOND G. RIESER
WILLIAM E. WAGNER
BY
Chisholm and Spencer
ATTORNEYS

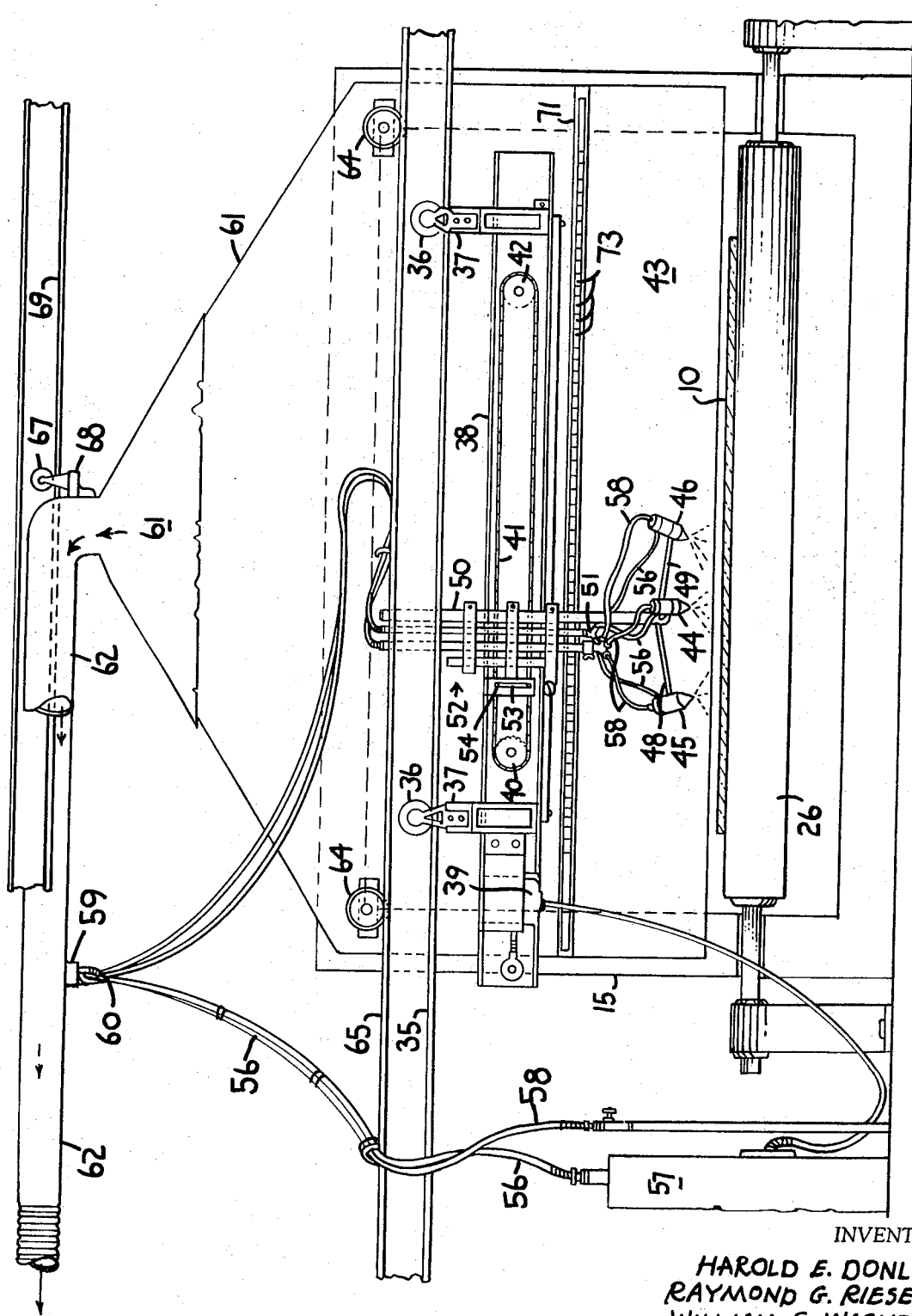

COATED GLASS SHEET AND METHOD FOR MAKING THE SAME

This application is a continuation-in-part of application, Ser. No. 684,131 of Harold E. Donley, Raymond G. Rieser and William E. Wagner filed Nov. 20, 1967 for Coating Glass and now abandoned.

This invention relates to Coating Glass, and particularly relates to a method of coating a heated sheet with a metal oxide coating by applying to the hot sheet in an oxidizing atmosphere a coating composition capable of pyrolizing on contact with the hot glass surface to form a metal oxide coating. In a sophisticated version of this invention, the coating produced alters the optical properties (transmission, absorption and reflection) of radiant energy in the visible, ultra-violet and infra-red bands of wave lengths in such a manner that the coated clear glass sheet has substantially the same optical properties to the naked eye as a glass sheet of a colored glass composition that includes coloring ingredients substantially uniformly dispersed throughout the glass volume.

Prior to the present invention, discrete sheets of commercial plate glass, soda-lime-silica compositions, some containing and others omitting coloring ingredients, have been heated to elevated temperatures suitable for pyrolysis and have been subjected to one or more coating compositions. Canadian Pat. No. 756,053 to Pittsburgh Plate Glass Company describes several examples of a method of coating discrete glass sheets to produce cobalt oxide coatings. The aforesaid patent indicates that glass sheets provided with a thin undercoat of tin oxide produced by spraying an organic tin composition, preferably one containing dibutyl tin oxide as an essential ingredient, followed by an immediate spray of cobalt acetylacetonate in a mixed organic vehicle, preferably, methanol and toluene, have a coating of better moisture resistance and durability than one formed without the tin oxide undercoating. Accelerated salt spray testing supplemented by outdoor exposure tests has indicated that cobalt oxide films on discrete sheets of float glass without the tin oxide undercoat have superior durability to plate glass sheets similarly coated and that cobalt oxide coatings formed directly on a newly formed ribbon have even greater durability than those formed on discrete sheets of either type of composition.

The need to convey discrete glass sheets on rollers causes the glass to become distorted during its heating while in the furnace. Discrete glass sheets undergo edge effects that cause their marginal portion to develop a significantly different temperature from that of the main body of glass. This temperature variation at the margin causes a different rate of film deposit thereon than in the main body. In coating a continuous ribbon of glass, there is no leading or trailing edge effect of this type because there is no leading and trailing edge in a continuous ribbon. The side edges of any continuous ribbon must be trimmed in any event when the ribbon is cut into glass sheets forming suitable articles of manufacture. Therefore, the marginal portions to be trimmed need not be exposed to a film forming spray. This results in economic use of the coating composition.

Furthermore, since a continuous ribbon of glass must be annealed anyway, the annealed glass can be cut into smaller sheets of stock size. Discrete glass sheets are usually heat-strengthened or tempered by rapid chilling after coating. Under ordinary circumstances, such discrete sheets cannot be cut to smaller sizes without danger of fracture.

The need for the present invention arose from the requirement of architects for glass panels of different colors to blend with the colors of walls in building they design. In the past, each different colored glass was produced by mixing and melting a different set of batch ingredients in a glass melting tank.

It is a time-consuming and costly operation to change the composition of molten glass in a tank to yield a new glass of a different color. Several days are usually needed from the time batch ingredients required to produce a new color are first added to the tank until the glass issuing from the tank is changed sufficiently to yield a color-homogenous product. It may even be necessary to drain a tank and refill it with new ingredients, particularly when production is changed from a colored glass to a clear glass.

The present invention permits the continuous manufacture of a clear or substantially colorless glass composition during the entire life of the tank without interruption for changing batch ingredients. Whenever it is desired to modify the apparent color of the glass or in some cases its radiant energy transmission, the ribbon is coated with a film to provide the clear glass ribbon with any one of several colored films which impart an appearance characteristic of transparent colored glass compositions without stopping the continuous delivery of the glass ribbon from the tank.

The present invention is particularly useful to impart a metal oxide coating on a continuous ribbon of float glass immediately after the glass ribbon is formed and during the time the ribbon is being delivered at a controlled rate through an oxidizing zone of controlled temperature sufficient to pyrolize the metallic film forming composition into a metal oxide having requisite properties and before the ribbon surface develops defects due to handling or exposure to a surface contaminant. The temperature of the glass is usually between 500° and 1,200° Fahrenheit when the coating composition is applied.

The present invention is particularly suitable to produce a family of coatings, each composed of a mixture of metal oxides having desired optical properties that are usually found in colored glass compositions, on a continuous ribbon of float glass that is essentially free of coloring ingredients except for impurities incorporated in the batch for making commercial float glass of soda-lime-silica composition.

The durability of metal oxide films formed by pyrolizing a film forming composition directly onto a heated surface of a continuous ribbon of float glass delivered to a coating station from a bath of tin-containing molten metal, such as molten tin or molten tin alloy conventionally used in a float glass manufacturing operation, is superior to those produced on other types of glass. This superior durability is believed to be due to the presence of tin vapor over the bath which deposits on the upper surface of the ribbon and at least part of which is believed to oxidize immediately on exposure to the oxidizing atmosphere of the coating station.

In a typical float glass operation, a continuous ribbon is drawn either along the surface of or through a bath of molten metal, preferably the former. The bath is usually tin or a tin-containing alloy, and preferably tin, contained in a reducing atmosphere consisting primarily of nitrogen and hydrogen. The bath is maintained at an elevated temperature so that the glass ribbon in contact therewith is sufficiently soft to flow or "fire-polish" out surface irregularities. The temperature of the bath is progressively decreased along the direction of ribbon movement to permit the ribbon to harden with its surfaces smooth enough to avoid the need for grinding and polishing. The hardened glass is removed from the end of the bath and conveyed through an annealing lehr on conventional conveyor rolls.

For reasons described above, the float process causes the surfaces of a float glass ribbon to be rich in tin and/or tin oxides. It is believed that this thin tin-containing surface layer enhances the adhesion of metal oxide films pyrolized thereon and thus permits the formation of films of great durability.

In the past, discrete glass sheets have been heated to a temperature sufficient for pyrolysis within a tunnel-like furnace and removed from the hot furnace to a relatively cool spraying area, where the film forming composition or a succession of compositions was applied. In the present method involving applying a coating composition to the upper surface of a newly formed ribbon, the coating is applied in an oxidizing atmosphere at an elevated temperature approaching that of the glass surface.

Film forming compositions previously used with success to produce colored metal oxide films on discrete glass sheets removed from a furnace to a relatively cold atmosphere and applied before the glass surface cooled below a temperature suitable for pyrolysis produce coatings having a mottled appearance when applied to the surface of a recently formed ribbon in a hot atmosphere. Another feature of the present invention improves the mottled appearance of the coated sheets by providing a solvent for the film forming composition that has a higher boiling point than solvents used previously and providing a delivery system for the filming composition that exposes the solvent directly to the hot atmosphere for a time interval too brief for the composition to volatilize completely before it makes contact with the surface to be coated.

The coloring coating compositions suitable for use in providing the optical properties of colored glass to a clear glass substrate comprise compositions containing metal salts dissolved in an organic vehicle, preferably one that is non-flammable and non-explosive at the temperature of applying the filming composition. The composition is stored under pressure in an enclosed system and delivered to spray guns in conduits insulated from the hot environment of the coating station. The spray guns are packed in thermal insulation to insulate the spray solution from the hot atmosphere of the spraying station, thus keeping the solution of coating composition in the liquid state and maintaining the metal concentration at the desired level until the spray is emitted from each spray gun. The spray is applied from the spray gun orifice at a rapid velocity toward the glass ribbon and traverses a relatively short distance en route to the ribbon so as to have the coating composition contact the glass before its solvent is completely evaporated. Preferably the distance from spray gun to ribbon surface is less than one foot.

Methylene chloride ($CH_2Cl_2$) is an excellent solvent for many organometallic salts used, has a sufficiently high boiling point to remain a liquid until it contacts the hot glass ribbon and is sufficiently non-explosive and non-flammable to be safe for handling. Furthermore, this solvent appears to be chemically stable and does not break down into corrosive compounds such as HCl and methane when precautions suggested herein are followed.

Several other aliphatic and olefinic halocarbons and halogenated hydrocarbons meet these requirements. These include:

methylene bromide ($CH_2Br_2$)
carbon tetrachloride ($CCl_4$)
carbon tetrabromide ($CBr_4$)
chloroform ($CHCl_3$)
bromoform ($CHBr_3$)
1,1,1-trichloroethane ($Cl_3C—CH_3$)

perchlorethylene ($Cl_2C=CCl_2$)

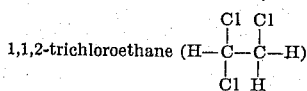
1,1,2-trichloroethane dichloroiodomethane ($CHCl_2I$)

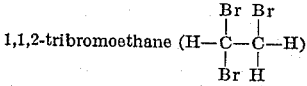
1,1,2-tribromoethane trichloroethylene ($Cl_2C=CClH$)

tribromoethylene ($Br_2C=CBrH$)

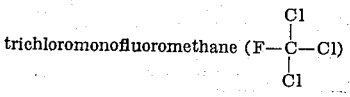
trichloromonofluoromethane hexachloroethane ($Cl_3C—CCl_3$)
1,1,1,2-tetrachloro- 2-fluoroethane ($Cl_3C—CHClF$)
1,1,2-trichloro- 1,2-difluoroethane ($FCl_2C—CHClF$)
tetrafluorobromoethane ($F_3C—CFBrH$) or ($F_2BrC—CF_2H$)
hexachlorobutadiene ($CCl_2 = CCl—CCl = CCl_2$) and
tetrachloroethane ($Cl_2HC—CHCl_2$). In addition, mixtures of two or more of the aforesaid organic solvents that are compatible may be used to develop a solvent incorporating an improved combination of desirable features.

Other solvents having superior dissolving power for the metal salts used such as various mixtures of one or more organic polar compounds such as an alcohol containing one to four carbon atoms and one hydroxyl group and one or more aromatic non-polar compounds taken from the class consisting of benzene, toluene and xylene may be used with caution. However, their volatility makes them more difficult to control in a hot environment than the solvents listed above, even though their superior solubility properties make them more desirable when applied in a relatively cold atmosphere where discrete sheets are coated.

While many organometallic salts, such as the acetates and 2-ethyl hexoates, are suitable to pyrolize on contact with hot glass to form a metal oxide film at a hot surface thereof, superior films result from applying the acetylacetonates of various metals in various relative concentrations in an organic vehicle to produce the desired colored appearance to a clear glass substrate.

Various metal salts have well known film forming properties. U.S. Pat. No. 3,244,547 to L. E. Orr et al., assigned to the Pittsburgh Plate Glass Company, and U.S. Pat. No. 2,564,708 show compositions capable of forming colored metal oxide films. However, to simplify storage and mixture problems, and to produce films having superior durability, it is convenient to use a family of compositions containing one or more of the acetylacetonates of cobalt, iron and chromium. Films having different colors resembling those of commercial colored glasses result from varying the relative concentrations of the ingredients in mixtures of these ingredients or from omitting one or more of the ingredients. Other pleasing coloring coating compositions are produced by using another family of compositions containing one or more metals of the class consisting of copper, manganese and nickel. Still other suitable coloring compositions contain one or more of any of the six metals enumerated above as well as vanadium and titanium salts that form metal oxides by pyrolysis on contact with a glass surface heated to a temperature above about 500° Fahrenheit.

The invention will be understood more clearly in the light of a description of illustrative embodiments that follows. In the drawings that form part of the description, and wherein like reference numbers refer to like structural elements, FIG. 1 is a fragmentary longitudinal sectional view of a float glass forming apparatus modified by the addition of spray apparatus according to the present invention, and FIG. 2 is a fragmentary, transverse sectional view taken across the spray apparatus of FIG. 1 along line II—II.

Referring to the drawings, a continuous glass ribbon 10 is shown on a bath 12 of molten liquid such as molten tin or tin alloy or other material contained within a refractory tank 14 encased in a metal sheath 15.

The ribbon 10 is lifted from the bath 12 at the exit end of the tank 14 on rolls 16 and 18, which are suitably journaled and driven by conventional roll driving means connected to a driving motor (not shown). Carbon blocks 20 and 22 are spring pressed against the bottom of the rotating rolls 16 and 18 to remove any materials which may become deposited thereon. The carbon blocks 20 and 22 are supported within a tank extension 24 into which material removed from the rolls falls and can be removed.

The glass is conveyed into an annealing lehr 25 having a plurality of lehr rolls 26, 27, 28, 29, etc., therein. A conventional driving means is provided for rotating the rolls in unison. Each lehr roll exerts a tractive force on the glass of sufficient magnitude to convey the glass through the lehr where its temperature is controlled to release permanent stress and strain in the glass.

The atmosphere of the bath 12 within tank 14 is a reducing atmosphere containing nitrogen with a small percentage of hydrogen in order to protect the bath from oxidization. Generally the atmosphere contains about 90 to 99.9 per cent nitrogen and the remainder hydrogen. The atmosphere is maintained at a slight pressure above ambient pressure, for example, 0.1 to 0.5 inch water, to substantially prevent the ingress of the ambient atmosphere within the tank 14.

To retain the atmosphere and to permit the passage of the glass ribbon from the tank 14, the exit end of the tank 14 is provided with a series of curtains or drapes 30 which trail on the glass ribbon. These drapes or curtains are usually made of a flexible asbestos material which does not mar the glass and which withstands the temperature of the environment, which is approximately 1,000° Fahrenheit to 1,200° Fahrenheit at or adjacent the exit end of the tank 14. Additional drapes or curtains 32 of similar material are provided at the entrance end of the lehr 25.

A pair of spaced horizontal channel beams 33 and 34 extend transversely over and beyond the sides of the path taken by the glass ribbon 10 between the tank 14 and the lehr 25 and are supported on vertical legs (not shown) disposed beyond the lateral sides of the tank 14 and lehr 25. The lower flanges of the channel beams are aligned with one another to form lower tracks 35 supporting wheels 36 attached in pairs to each of a pair of brackets 37. The latter extend downward from the wheels 36 and are attached at their lower end to a cross beam structure 38.

A motor 39 is supported on the cross beam structure 38, and is coupled to a drive sprocket 40. The latter, in turn, is connected through a chain drive 41 to a driven sprocket 42. Sprockets 40 and 42 are rotatably mounted to the cross beam structure 38 for rotation about parallel axles extending lengthwise of the path of movement for the glass ribbon 10.

The cross beam structure 38 is superimposed over a spray chamber 43. A plurality of spray guns 44, 45 and 46 are arranged in triangular configuration with the spray gun orifices extending in an obliquely downward direction inward of the triangle and toward the upper surface of the ribbon 10 as the latter traverses the spray chamber 43. Each of the spray guns are supported by one of three extension rods 47, 48 and 49. The latter, in turn, are swively and rotatably mounted to a vertical rod 50. A water cooled manifold 51 is disposed in the distribution line for supplying coating composition to the spray guns. The vertical rod 50 is adjustably mounted to an open bracket 52.

The open bracket 52 contains a slotted member 53 having a vertical slot adapted to receive a lug 54 carried by one of the links of the chain drive 41. The lug interfits the vertical slot to support the open bracket 52 adjacent the chain drive 41.

Each of the spray guns 44, 45 and 46 has a suitable hose connection through the manifold 51 to a flexible supply hose 56 attached to a fluid supply drum 57 in which spray composition is stored under pressure, and an air supply hose 58 connected to a source of pressurized air (not shown). An overhead beam 59 contains a hook 60 for supporting the flexible hoses 56 and 58 in a manner such as to permit the flexible hoses to follow reciprocation of the open bracket 52 in response to actuation of the chain drive 41 whenever motor 39 is operated.

Flexible hoses 56 and 58 are suitably insulated from the environmental heat by being encased within a steel-reinforced, teflon-lined, neoprene sleeve. The spray guns are also suitably insulated by wrapping in fiber glass insulation.

To the fore and aft of the spray chamber 43 there is disposed a vacuum hood 61. These hoods extend vertically upward to a pair of exhaust pipes 62 and are spaced from one another sufficiently to provide clearance for the horizontal channel beams 33 and 34 and the apparatus movably supported from the channel beams including the spray guns 44, 45 and 46.

It is thus seen that the production of a ribbon of glass 10 need not be interrupted whenever it is required to change the coating on the glass ribbon. It is only necessary to move the cross beam structure 38 into position over the moving ribbon 10 between the extension of the tank 24 and the entrance to the lehr 25 and to apply the filming composition via the spray guns 44, 45 and 46 while reciprocating the guns in response to reciprocation of the open bracket 52 responsive to actuation of the chain drive 41.

The vacuum hoods 61 may be readily removed and replaced with refractory brick in the space between the tank extension 24 and the lehr 25. To accomplish this, each vacuum hood 61 is provided with a pair of wheels 64 which ride on an upper track 65 formed on the upper surface of the horizontal channel beams 33 and 34. Additional wheels 67 attached to brackets 68 mounted to the exhaust pipe 62 permit the exhaust pipe 62 to be moved with the hoods 61 by riding the wheel 67 along tracks 69 carried by an overhead beam 70.

Each hood 61 carries a horizontal lower slotted roof 71. The slot extends across the roof 71 to provide a very narrow clearance 72 between the roof elements for reciprocating the relatively narrow vertical rod 50, and the pipes 58 and 56, which supply air and spraying composition to the spray guns. Additional slots 73 are formed in the roof 71 to provide additional passages to withdraw excess spray from the spray chamber 43 into the exhaust hoods 61 along the paths depicted by the short arrows in FIG. 1.

Since the atmosphere above the bath of molten liquid 12 contains tin, the outer surfaces of the float glass ribbon are richer in tin than the main body of the glass. Because the atmosphere above the tin bath is at a pressure slightly above the atmospheric pressure, some tin in vapor state escapes from the atmosphere above the refractory tank 14 into the spray chamber 43, which is essentially an oxidizing atmosphere. The exposure to the oxidizing atmosphere is believed to result in the outer surfaces of the ribbon of float glass containing a small amount of tin in the form of a tin oxide. This exposure to an oxidizing atmosphere reduces the need for applying a sensitizing film of tin oxide to adhere the colored film to the glass.

The richness of tin in the ribbon surfaces is determined in the following manner. The surfaces of the ribbon are prepared for chemical analysis for tin by dissolving each glass surface to a depth of approximately 5 microns. Samples of each solution from each glass surface are analyzed for tin by polarographic analysis and found to contain 0.08 per cent by weight of tin in the form of stannous oxide in the samples taken from the upper surface of the ribbon and 2.2 per cent tin by weight in the form of stannous oxide in the samples taken from the lower surface of the ribbon that contacted the molten tin bath.

The various coating compositions listed below are applied onto the upper surface of float glass having the following chemical composition as determined by wet chemical analysis for sodium and X-ray diffraction analysis for the other ingredients:

TABLE I

Typical Analysis of Commercial Float Glass

| Component | Parts by Weight |
|---|---|
| $SiO_2$ | 73.05 |
| $Na_2O$ | 13.68 |
| $K_2O$ | 0.68 |
| $CaO$ | 8.91 |
| $MgO$ | 3.85 |
| $Al_2O_3$ | 0.11 |
| $SO_3$ | 0.37 |
| $Fe_2O_3$ | 0.128 |

By applying various formulations of filming compositions as described in Table II for the various batches, coated glass having different color characteristics and spectral data depicted in Table III are produced.

The formulations of various coating compositions are listed for batches containing 20 gallons of a mixture of organic solvents consisting of 5 gallons of methanol and 15 gallons of toluene which contain various amounts of one or more of the metal acetylacetonates as depicted in Table II that follows:

TABLE II.—FORMULATIONS OF FILM FORMING SPRAY COMPOSITIONS

| Ingredient (unit) | Formulation number | | | | | | |
|---|---|---|---|---|---|---|---|
| | #8015 | #8016 | #8025 | #8027 | #8028 | #8031 | #8032 |
| Cobalt acetylacetonate (pounds) | 12.55 | 9.63 | 6.0 | | | | |
| Iron acetylacetonate (pounds) | 3.14 | 4.12 | | | 19.6 | 3.0 | 11.75 |
| Chromium acetylacetonate (pounds) | 4.21 | 6.30 | 15.0 | 21.0 | | 17.9 | 8.45 |

The above formulations are based on a concentration of 2 per cent by weight of total metal. It is understood that a 2 per cent concentration of metal by weight in other organic solvents can be readily calculated, taking into account the difference in specific gravity of the solvent employed. For example, the above formulations are mixed with 12.6 gallons of methylene chloride instead of 20 gallons of the methanol-toluene mixture recited above to produce spraying compositions containing a total metal content of 2 per cent by weight in methylene chloride.

Table III contains the appearance or color of clear glass having different coatings of 500 Angstrom units in thickness produced by applying the various coating formulations of Table II to clear glass, and various transmission coefficients, such as luminous transmittance (the transmission coefficient of the coated glass in the visible portion of the spectrum, denoted by VIS.), the ultra-violet transmittance (transmission coefficient of the coated glass in the ultra-violet band, denoted by U.V.), the infra-red transmittance (transmission coefficient in the infra-red band, denoted by I.R.) and the total solar energy transmittance (transmission coefficient for the total spectrum, denoted by T.S.E.) using as a solar light source illuminant "C" for testing the latter. The transmission determinations were made by spectroscopy using routine laboratory procedures.

TABLE III.—CHARACTERISTICS OF FILMED GLASS

| Coating from formulation number | Color | VIS*, percent | U.V.*, percent | I.R.*, percent | TSE*, percent |
|---|---|---|---|---|---|
| 8015 | Reddish-brown | 38 | 22.8 | 51.4 | 43.0 |
| 8016 | do | 37.2 | 22.4 | 48.7 | 41.7 |
| 8025 | Greenish | 58.0 | 29.0 | 56.7 | 58.3 |
| 8027 | do | 58 | 31 | 57 | 57 |
| 8028 | Amber | 36.8 | 10.2 | 52.5 | 47.1 |
| 8031 | Gray | 51.6 | 28.5 | 58.1 | 54.2 |
| 8032 | Reddish-brown | 43.2 | 17.5 | 55.8 | 49.0 |

Of the above coated products, the reddish-brown appearing products resulting from coating clear glass with coatings formed by pyrolizing filming compositions 8015, 8016 and 8032 have optical characteristics substantially identical in appearance to products marketed by Pittsburgh Plate Glass Company (PPG Industries, Inc.) under the trade name of SOLARBRONZE, those resulting from coating clear glass with films formed by pyrolizing compositions 8025 and 8027 are substantially identical in appearance to products marketed by Pittsburgh plate Glass Company (PPG Industries, Inc.) under the trade name of SOLEX and those resulting from coating clear glass with a film formed by pyrolizing composition 8031 are substantially identical in appearance to products marketed by Pittsburgh Plate Glass Company (PPG Industries, Inc.) under the trade name of SOLARGRAY.

The article produced by the method described in the following examples has fire polished surfaces that are relatively rich in tin content compared to the interior of the glass article. One of the tin enriched surfaces is coated with a film that gives the entire article the optical appearance of a colored glass composition to the human eye. The fire polished surface is stronger than a ground and polished surface of plate glass. In addition, the article is less subject to breakage on continuous exposure to hot sunlight than an article of similar appearance that is formed of a homogenous colored glass, because the article produced by the present method absorbs and reflects incident radiation almost exclusively at the coated surface rather than distributed throughout its thickness and is less liable to establish stresses that induce fracture.

The ribbon to be coated arrives in a heated condition with the heat required for pyrolysis remaining from the ribbon forming. It is not necessary to reheat the ribbon delivered from a molten tin bath as is necessary in coating discrete sheets. At usual production speeds, each increment of length of new ribbon is exposed to an oxidizing atmosphere from at least 3 to approximately 20 seconds before the film forming composition begins to contact said increment. Exposure to the pyrolyzable film forming composition continues in an oxidizing atmosphere for about 2 to 40 seconds.

Much spray composition is wasted by continuously spraying in the spaces between discrete sheets, which are conveyed through a spray station in spaced relation. The reverse surface of the discrete sheets also receive an "overspray," which must be removed. Neither of the above problems exists when a continuous ribbon is sprayed over all but the marginal portions that must be trimmed anyway. In addition, a newly formed ribbon arrives at a coating station in a pristine state, and requires no cleaning of the surface to be coated as do discrete sheets that have been handled.

EXAMPLE I

A typical production run to produce a coated float glass ribbon with composition No. 8015 shows the feasibility of providing a coated glass to fill an order of small volume for a colored glass composition. In this run, methylene chloride is the solvent for the coating composition. To each gallon of methylene chloride, 590 grams of cobalt acetylacetonate, 147 grams of ferric acetylacetonate and 199 grams of chromic acetylacetonate are added to produce a coating composition having a total of 3 per cent by weight of metal in solution.

The ribbon moves at a speed of 190 inches per minute and a bank of three Binks Model 21 spray guns are reciprocated over a 90 inch wide path disposed above the central portion of the ribbon at 16 ½ cycles per minute. The ribbon temperature is between 1,000° Fahrenheit and 1,100° Fahrenheit in the coating station and about 1,065° Fahrenheit where the ribbon first crosses the spray.

The spray guns are mounted in a triangular array and moved in unison in a direction normal to the longitudinal path of glass ribbon movement with the center gun pointed directly downward, its orifice being 11 inches above the ribbon. The other two spray guns are mounted in symmetrical relation to the first gun and pointed obliquely downward toward the center of the array with their orifices located 9 inches above the ribbon. The outer guns are 30 inches apart at their upper ends and 23 inches apart at their orifices. The spray gun orifices are set at 0.033 inch diameter.

Air is supplied to each spray gun under pressure of 55 pounds per square inch measured at the source. The spray composition is applied at a pressure of 7.5 pounds per square inch. During a 9 minute run required to produce the needed colored glass, 1.76 gallons of the above solution are dispensed onto the ribbon.

The float glass ribbon is then annealed in an oxidizing atmosphere using regular annealing procedures of commercial production and the coated glass then cut to desired size. The appearance of the cut coated glass articles so produced is acceptable for color by inspection with the naked eye and resembles the appearance of a colored glass composition sold under the trade name of SOLARBRONZE.

The durability of coated sheets produced according to Example I has been tested by cutting 20 samples each 12 inches by 12 inches, from the continuous ribbon of float glass coated as described in Example I and subjecting the samples to a continuous spray within an enclosed chamber as described in Method 811 of the Federal Test Method Standard No. 151 (formerly Federal Specification ZZ–M–151) entitled "Salt Spray Test." The spray is a 5 per cent sodium chloride solution in the form of a fog that is sprayed at 95° Fahrenheit and that condenses on the film surface. After more than 1,200 hours of continuous exposure to the salt spray, none of the samples exhibited film attack.

The appearance of the above Example I samples exposed to the salt spray test as well as other samples removed from the coated float glass ribbon produced according to Example I was compared to articles produced by coating discrete sheets heated to an elevated temperature within a furnace and coated in a relatively cold environment with a composition containing a formulation bearing the same ratio of metal acetylacetonates as composition 8015. The color of the samples could not be distinguished by the naked eye. However, there appeared to be a more continuous film on those samples produced by coating a continuous ribbon of float glass as explained in Example I than on discrete sheets of float glass coated in a relatively cold atmosphere after heating. It is believed that this superiority of film continuity is due to better thermodynamics in the hotter atmosphere of the coating station on the float glass line.

Continuity of film is determined by counting the number of pin holes per unit area when a sample is placed on a sheet of fused glass with a fluorescent light background in a darkened room after a preselected exposure to the salt test.

Of the 20 Example I samples tested in the salt spray test, 11 had a total of 13 pinholes and 9 samples were completely free of pinholes. This averages 0.65 pinholes per square foot. This compares to an average of 4 to 5 pinholes per square foot of samples similarly tested, but produced by coating discrete sheets in a relatively cold atmosphere after heating in a furnace. These pinholes are usually too tiny to be observed by an untrained layman and are generally observable only by people skilled in the art to observe these defects.

In addition, while none of the samples produced by coating a float glass ribbon immediately after its formation followed by annealing and cutting the ribbon showed fingerprints, several samples produced from discrete sheets showed coating deletions in the form of fingerprints after a salt spray test. This indicates the need for careful handling and washing of discrete sheets before the coating operation, whereas the continuous ribbon is coated in its nascent state without contact with human fingers which deposit moisture and salts on the surface of discrete sheets when handled carelessly.

The procedure of EXAMPLE I is followed, except that for each gallon of methylene chloride used, metal acetylacetonates are added in different concentrations to produce coated sheets having the appearance of filmed glasses produced by the formulations listed in Table II and characteristics substantially identical to those listed in Table III.

EXAMPLE II

Following the procedure of Example I, except that 474 grams of cobalt acetylacetonate, 194 grams of iron acetylacetonate and 296 grams of chromium acetylacetonate are added to each gallon of methylene chloride, coated sheets having an appearance indistinguishable to the naked eye from those resulting from coating float glass with a solution containing formulation No. 8016 are produced.

EXAMPLE III

Following the procedures of Example I and II, except that the spraying composition contains 282 grams of cobalt acetylacetonate and 705 grams of chromium acetylacetonate added to each gallon of methylene chloride, coated sheets having an appearance indistinguishable to the naked eye from those resulting from coating with a solution of formulation No. 8025 are produced from the coated ribbon.

EXAMPLE IV

The float glass ribbon is treated as in the previous examples, except that the coating composition contains 987 grams of chromium acetylacetonate added to each gallon of methylene chloride. Coated sheets cut from the float glass ribbon so treated have an appearance indistinguishable to the naked eye from those produced by applying coating composition No. 8027.

EXAMPLE V

The same treatment is conducted as in the previous examples, except that the coating composition contains 920 grams of iron acetylacetonate added to each gallon of methylene chloride. The resulting coated sheets appear indistinguishable to the naked eye from those produced by applying composition No. 8028.

EXAMPLE VI

The same treatment is conducted using a solution of 141 grams of iron acetylacetonate and 841 grams of chromium acetylacetonate for each gallon of methylene chloride. The resulting products cannot be distinguished by the naked eye from those produced by spraying with composition No. 8031.

EXAMPLE VII

Using the same treatment as in the previous examples, except that the spraying composition contains 552 grams of iron acetylacetonate and 397 grams of chromium acetylacetonate, produces glass sheets having an appearance indistinguishable to the naked eye from those produced by applying coating composition No. 8032.

The film thickness is controlled by using a machine sold under the trade name of Chromoscope by the Millitron Company of Pittsburgh, Pennsylvania. This machine measures the reflectance of blue light and reflectance of red light, determining the thickness of the film as a function of the ratio of said reflectances. The flow rate of the filming compositions is adjusted, if necessary, to compensate for any variation from desired thickness.

Other solvents that are more volatile, but have superior dissolving power for the metal salts used may be employed when the continuous ribbon of float glass is coated further along the annealing lehr where the temperature of the ribbon approaches 500° Fahrenheit. Under such circumstances, materials that are explosive and/or flammable in the atmosphere immediately beyond the float glass tank may be used without the extraordinary precautions required at higher temperatures because the conditions for explosion or flammability are less hazardous. Even the cool end of an annealing lehr for a float glass tank has a greater tin concentration than normal atmosphere because of longitudinal air currents throughout the length of the lehr. The tin in the oxidizing atmosphere is believed to have a beneficial effect on the film durability even when the coating is applied in a portion of the lehr as cool as 500° Fahrenheit.

In general, films produced at lower temperatures are less durable than those produced at higher temperatures. However, economics (cost of ingredients) may dictate coating at lower temperatures of the acceptable range with less expensive solvents in cases where the filmed articles are to be used in atmospheres where they are not exposed to conditions that affect durability, such as the inner surface of a sheet used in a multiple glazing unit.

The following experiments using variations in the accelerated salt spray tests described above indicate the superiority of applying a cobalt oxide coating directly onto a recently formed float glass ribbon without a tin oxide undercoat and also indicate the relative merits of a previously handled float glass substrate to a ground and polished plate glass composition. A 5 per cent salt spray was applied at 95° Fahrenheit at 27 samples of discrete plate glass sheets containing cobalt oxide films applied directly to the glass sheets without a tin oxide undercoat. All films showed failure after 60 hours. Two of these films showed failure after 24 hours and nine others after 48 hours. Another group of 4 discrete sheets of float glass similarly coated was subjected to a 20 per cent salt spray. Failure was observed in from 240 to 744 hours in this second group. By contrast, not a single one of many samples of float glass coated with cobalt oxide without an undercoat by applying the composition to a newly formed ribbon has shown any failure after more than 1,200 hours of salt spray testing. Past tests have indicated that coatings showing failure after 48 hours of salt spray exposure failed after 6 months of outdoor exposure. While no direct ratio of salt spray exposure time to outdoor exposure has been established, these tests demonstrate that articles coated with cobalt oxide using float glass as the base have superior durability to those of plate glass even without a tin oxide undercoat and that vastly superior durability results from coating a newly formed float glass ribbon.

In typical float glass operations involving ribbon speeds of 10 to more than 20 feet per minute and a spray booth disposed over 4 to 6 feet of ribbon length and spaced from 8 inches to 2 feet from the exit of the tin bath, each ribbon increment is exposed to the oxidizing atmosphere from 3 to 20 seconds before its exposure to the pyrolyzing composition. Its exposure to the pyrolyzing composition lasts from approximately 10 to 40 seconds in an oxidizing atmosphere. The coated ribbon remains in an oxidizing atmosphere throughout its annealing.

The above described embodiments of the present invention involving coating float glass has enabled the glass art to eliminate an important step of the prior art, namely, a precoating treatment to produce a tin oxide undercoat. When forming float glass it is believed that sufficient tin remains on the upper surface of the ribbon leaving the bath containing molten tin to enable at least some of the tin atoms in the surface portion to oxidize into tin oxide in the oxidizing atmosphere to which the newly formed ribbon is exposed. This is believed to help adhere the pyrolyzed metal oxide films to the glass.

The present invention has also produced more uniform coloring throughout the extent of coated glass sheets than those produced by heating and coating discrete glass sheets, because discrete sheets have edge effects resulting from excessive heating along the edges. In addition, the coating composition is used more efficiently while coating a ribbon rather than discrete sheets, because none is wasted in the spaces between adjacent sheets and there is no overspray that must be removed from discrete sheets.

The form of the invention shown and described in this disclosure represents certain illustrative embodiments. For example, a method of coating a float glass ribbon of a composition containing only impurity quantities of coloring ingredients has been described. It is understood that any campaign involving the continuous production of a ribbon of float glass from a batch mixture of ingredients having a substantially unchanged ratio throughout the campaign of the tank including those having coloring ingredients are susceptible of periodic coating with coloring compositions as required to change the appearance of the float glass product also fall within the purview of the present invention. It is understood that various other changes may be made without departing from the spirit of the invention as defined in the claimed subject matter that follows.

What is claimed is:

1. In a continuous method of producing a transparent color-coated ribbon of glass formed by depositing molten glass on a liquid bath of a tin-containing molten metal wherein said ribbon of glass passes through a chamber containing a reducing atmosphere and a vapor containing tin atoms while supported with its lower surface contacting said liquid bath, until the tin-containing material in said vapor introduces tin in a reduced state into the upper surface of said ribbon whereby the upper surface thereof contains a greater concentration of tin than is present in the interior of said ribbon, the improvement comprising:

1. removing said ribbon of glass from said chamber and passing it through an oxidizing atmosphere,
 2. maintaining each increment of length of said ribbon in said oxidizing atmosphere at a temperature above about 500° F. for a period of at least about 3 seconds before further coating, and then immediately
 3. applying a coating composition responsive to thermal treatment containing a metal compound capable of thermally reacting on contact with hot glass to be converted into a colored metal oxide reaction product at temperatures above about 500° F. to said upper surface of said increment of length of said continuous ribbon while said upper surface is passing through said oxidizing atmosphere and while said upper surface is at a temperature between about 500° and about 1,200° F. until said coating composition thermally reacts to form a colored metal oxide coating on said upper surface of said ribbon.

2. The improvement as in claim 1, further including annealing said coated ribbon to be cut into smaller sheets without fracture.

3. The improvement according to claim 1, wherein said continuous ribbon is produced throughout the lifetime of a campaign of a glass making tank from a batch mixture of ingredients having a predetermined ratio thereof throughout said campaign.

4. The improvement as in claim 1, wherein said glass is a soda-lime-silica glass that contains only impurity quantities of glass coloring ingredients.

5. The improvement as in claim 1, wherein said surface is contacted with an acetylacetonate of a metal taken from the glass consisting of cobalt, iron, chromium, copper, manganese, nickel and mixtures thereof dissolved in an organic solvent that is non-explosive and non-flammable at said temperature range, said solvent being taken from the class consisting of aliphatic and olefinic halocarbons and halogenated hydrocarbons.

6. The improvement as in claim 1, wherein said liquid composition is insulated from the elevated temperature of said atmosphere and is released into said atmosphere sufficiently close to said tin-enriched surface and applied toward said surface at a rate rapid enough to enable said composition to arrive at said surface before said film forming composition is completely volatilized.

7. The improvement as in claim 1, wherein said coating composition is applied to each increment of length of said surface of said moving ribbon for a period of from 2 to 40 seconds.

8. In a continuous method of producing a transparent color-coated ribbon of glass formed by depositing molten glass on a liquid bath of a tin-containing molten metal wherein said ribbon of glass passes through a chamber containing a reducing atmosphere and a vapor containing tin atoms while supported with its lower surface contacting said liquid bath, until the tin-containing material in said vapor introduces tin in a reduced state into the upper surface of said ribbon whereby the upper and lower surfaces thereof contain a greater concentration of tin than is present in the interior of said ribbon, the improvement comprising:

1. removing said ribbon of glass from said chamber and passing it through an oxidizing atmosphere,
 2. maintaining each increment of length of said ribbon in said oxidizing atmosphere at a temperature above about 500° F. for a period of at least about 3 seconds before further coating, and then immediately
 3. applying a coating composition responsive to thermal treatment containing a metal compound capable of thermally reacting on contact with hot glass to be converted into a colored metal oxide reaction product at temperatures above about 500° F. to at least one of said surfaces of said increment of length of said continuous ribbon while said surface is passing through said oxidizing atmosphere and while said surface is at a temperature between about 500° and about 1,200° F. until said coating composition thermally reacts to form a colored metal oxide coating on said surface of said ribbon.

9. A float glass sheet having tin-enriched surfaces maintained under oxidizing conditions after the withdrawal thereof from the float glass forming chamber and a pyrolytically formed, transparent colored coating on at least one of said surfaces which sheet is produced according to the method of claim 8.

* * * * *